United States Patent [19]

Bach et al.

[11] Patent Number: 5,332,520
[45] Date of Patent: Jul. 26, 1994

[54] LIQUID-CRYSTALLINE POLYMERS OF VIRTUALLY UNIFORM MOLECULAR WEIGHT

[75] Inventors: Volker Bach, Neustadt; Karl-Heinz Etzbach; Karl Siemensmeyer, both of Frankenthal, all of Fed. Rep. of Germany

[73] Assignee: BASF Aktiengesellschaft, Ludgwigshafen, Fed. Rep. of Germany

[21] Appl. No.: 880,578

[22] Filed: May 8, 1992

[30] Foreign Application Priority Data

May 10, 1991 [DE] Fed. Rep. of Germany ....... 4115415

[51] Int. Cl.$^5$ ............... C09K 19/52; C08F 22/10; G11B 7/24
[52] U.S. Cl. .................. 252/299.01; 526/318; 526/319; 430/20; 428/1
[58] Field of Search .......... 252/299.01, 299.61, 252/299.62, 299.63, 299.64, 299.65, 299.66, 299.67; 526/313, 243, 245, 318, 318.1, 319; 430/20, 945; 428/1

[56] References Cited

U.S. PATENT DOCUMENTS

| | | |
|---|---|---|
| 4,844,835 | 7/1989 | Uchida et al. |
| 4,997,591 | 3/1991 | Heppke et al. .............. 252/299.01 |
| 5,187,248 | 2/1993 | Etzbach et al. .............. 526/243 |
| 5,187,298 | 2/1993 | Etzbach et al. .............. 549/555 |
| 5,212,027 | 5/1993 | Etzbach et al. .............. 430/20 |

FOREIGN PATENT DOCUMENTS

| | | |
|---|---|---|
| 0184482 | 11/1986 | European Pat. Off. |
| 0228703 | 7/1987 | European Pat. Off. |
| 0399279 | 11/1990 | European Pat. Off. |
| 0412485 | 2/1991 | European Pat. Off. |
| 3917196 | 12/1990 | Fed. Rep. of Germany |
| 3930667 | 3/1991 | Fed. Rep. of Germany |

WO90/00586 1/1990 PCT Int'l Appl.

OTHER PUBLICATIONS

"Ferroelectric Liquid Crystals," S. T. Lagerwall, et al. *Mol. Cryst. Liq. Cryst.*, 1984, vol. 114, pp. 151–187, Golden and Breach Science Publishers, Inc: USA.

"Ferroelectric Memories," Carlos A. Paz de Araujo, et al. *Ferroelectrics*, vol. 104, pp. 241–256, Golden and Breach Science Publishers S.A.: USA.

*Primary Examiner*—Shean Wu
*Attorney, Agent, or Firm*—Oblon, Spivak, McClelland, Maier & Neustadt

[57] ABSTRACT

A liquid-crystalline polymer of virtually uniform molecular weight, obtainable by polymerizing identical or different monomers of the formula I $$CH_2=\overset{R}{\underset{|}{C}}-COO-A-B-C \qquad I$$

where
R is hydrogen, chlorine or methyl,
A is a flexible, long-chain moiety which acts as a spacer, is a mesogenic moiety built up from at least two aromatic rings which are linked to one another in a linear or approximately linear manner, and
C is an optically active, chiral moiety, in from 0.01 to 0.1 molar solution in an inert organic solvent in the presence of from 1 to 40 mol %, based on the monomers, of a free-radical initiator, at from 40° to 60° C. for from 100 to 140 hours, and subsequently isolating the polymerization product from the reaction mixture, and the use thereof for building up recording layers for laser-optical and electrical recording elements and for electrophotography and for building up liquid-crystalline display elements.

7 Claims, No Drawings

LIQUID-CRYSTALLINE POLYMERS OF VIRTUALLY UNIFORM MOLECULAR WEIGHT

The present invention relates to novel liquid-crystalline polymers of virtually uniform molecular weight, obtainable by polymerizing identical or different monomers of the formula I $$\text{CH}_2=\overset{R}{\underset{|}{C}}-\text{COO}-A-B-C \qquad \text{I}$$

where
R is hydrogen, chlorine or methyl,
A is a flexible, long-chain moiety which acts as a spacer,
B is a mesogenic moiety built up from at least two aromatic rings which are linked to one another in a linear or approximately linear manner,
C is an optically active, chiral moiety,
in from 0.01 to 0.1 molar solution in an inert organic solvent in the presence of from 1 to 40 mol %, based on the monomers, of a free-radical initiator and from 40° to 60° C. for from 100 to 140 hours, and subsequently isolating the polymerization product from the reaction mixture.

The present invention furthermore relates to the preparation of these polymers and to their use for building up recording layers for laser-optical and electrical recording elements and for electrophotography and for building up liquid-crystalline display elements.

Chiral, smectic, liquid-crystalline polymers which solidify in a glass-like manner on cooling from the liquid-crystalline phase to forth a layer structure are employed, as is known, for many purposes in the electro-optical sector. Examples of applications are optical storage systems (DE-A-3 827 603 and DE-A-3 917 196), electrophotography (DE-A-3 930 667), liquid-crystalline display elements, such as displays (Mol.Cryst.Liq.-Cryst. 114, pp. 151-187 (1984)) and, if they also have a ferroelectric behavior, electrical storage systems (Ferroelectrics 104, pp. 241-256 (1990)).

In the layer structure of ferroelectric $S_c^*$ phases, the molecular long axes within an individual layer are tilted with respect to the layer normal $\vec{Z}$. The direction of this tilt is indicated by the director $\vec{n}$, and the angle between $\vec{Z}$ and $\vec{n}$ is known as the tilt angle $\phi$. $S_c^*$ phases have two stable states with opposite directions of $\vec{n}$, between which it is possible to switch rapidly by application of an electrical field (electro-optical effect).

$S_c^*$ phases are formed, inter alia, by polymers containing chiral mesogenic side groups, as described, for example, in DE-A-3 917 196 and the literature cited therein.

However, the liquid-crystalline polymers prepared hitherto are always mixtures of polymers of many different degrees of polymerization and molecular weights, which means that their applicational properties are significantly impaired, as evidenced, for example, by slow response times or narrow state ranges of switchable phases.

It is an object of the present invention to provide liquid-crystalline polymers which have virtually uniform molecular weights and thus improved applicational properties.

We have found that this object is achieved by the liquid-crystalline polymers defined at the outset, and by a process for the preparation of these polymers.

These polymers can be used to build up recording layers for laser-optical and electrical recording elements and for electrophotography and for building up liquid-crystalline display elements.

The liquid-crystalline polymers according to the invention have virtually uniform molecular weights with non-uniformities of, in general, $\leq 0.1$.

As is known, the non-uniformity U is defined as follows:

$$U = D - 1$$

The dispersity D corresponds to the quotient of the weight average molecular weight $\overline{M}_w$ and the number average molecular weight $\overline{M}_n$:

$$D = \frac{\overline{M}_w}{\overline{M}_n}$$

with $$\overline{M}_w = \frac{\sum\limits_{i=1}^{n} n_i M_i^2}{\sum\limits_{i=1}^{\infty} n_i M_i} \quad \text{and} \quad \overline{M}_n = \frac{\sum\limits_{i=1}^{n} n_i M_i}{\sum\limits_{i=1}^{\infty} n_i}$$

$n_i$ = number of polymer molecules comprising i monomers
$M_i$ = molecular weight of the polymer molecule comprising i monomers.

A known method for determining the non-uniformity is gel permeation chromatography, which is described, for example, in Analytiker-Taschenbuch Vol. 4, pp. 415-442, Springer-Verlag (1984).

The starting monomers of the formula I $$\text{CH}_2=\overset{R}{\underset{|}{C}}-\text{COO}-A-B-C \qquad \text{I}$$

and their preparation are disclosed in DE-A-3 917 196.
R here is chlorine or methyl, but preferably hydrogen.
A is preferably an alkylene group $-(\text{CH}_2)_n-$ wherein n=2 to 20, preferably 6 to 11.
B is built up from at least two aromatic rings which are linked to one another in a linear or approximately linear manner.
B is preferably, for example, a group of the formulae II to V:

where
- $B^1$ are identical or different and are p-phenylene or 4,4-biphenylene,
- $B^2$ are identical or different and are p-phenylene, 4,4-biphenylene or 2,6-naphthylene,
- Y are identical or different and are preferably —O—, —COO— or —OCO—, or alternatively —CH$_2$—O—, —O—CH$_2$—, —COS—, —SCO— or a chemical bond.
- m and n are 0, 1 or 2, where m and n must not simultaneously be 0,
- m' and n', independently of one another, are 0, 1 or 2,
- m" and n", independently of one another, are 0 or 1.

Examples of particularly preferred groups B are the following:

II:

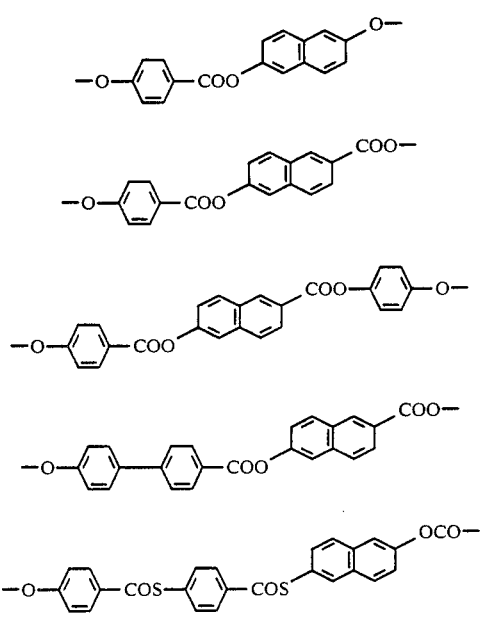

III:

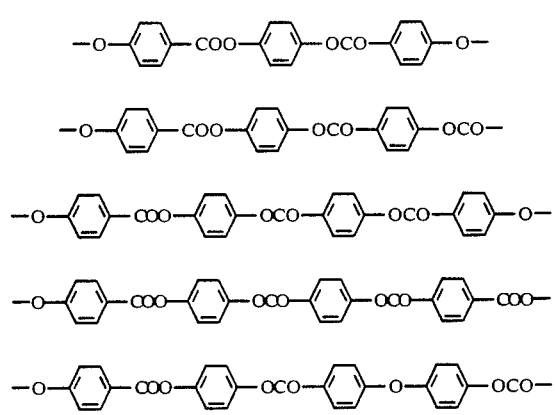

IV:

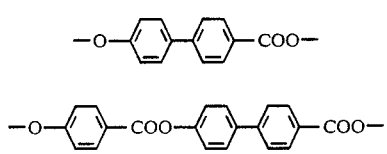

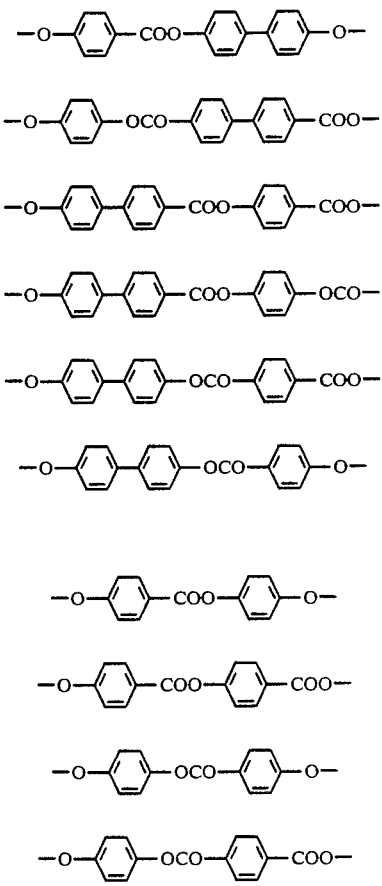

V:

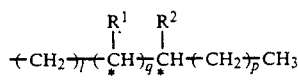

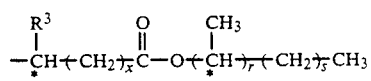

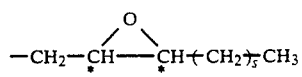

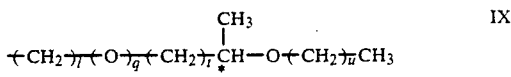

Examples of chiral moieties C are preferably those of the formulae VI to IX:

$$\underset{*}{+CH_2 +_t} \overset{R^1}{\underset{*}{CH}} \overset{R^2}{\underset{*}{+_q CH +}} CH_2 +_p CH_3 \quad \text{VI}$$

$$-\underset{*}{CH} \overset{R^3}{+CH_2 +_x} \overset{O}{\overset{\|}{C}} -O+ \underset{*}{CH} \overset{CH_3}{+_r} CH_2 +_s CH_3 \quad \text{VII}$$

$$-CH_2 - \underset{*}{CH} \overset{O}{\overline{\phantom{--}}} \underset{*}{CH} + CH_2 +_s CH_3 \quad \text{VIII}$$

$$+CH_2 +_t +O +_q + CH_2 +_r \underset{*}{CH} \overset{CH_3}{-O} + CH_2 +_u CH_3 \quad \text{IX}$$

where
- $R^1$ is halogen, such as chlorine or bromine, or methyl,
- $R^2$ is halogen, such as chlorine or bromine, cyano or methyl,
- $R^3$ is methyl or trifluoromethyl, l, t and u are 0 or 1 to 10,
- q is 0 or 1,
- p is 0 or 1 to 10, where p must not be 0 if $R^2$ is methyl,
- x and r are 0 or 1,
- s is 1 to 3.

Particular preference is given to radicals of the formula VII.

Examples of the radical C are the following groups:

VI:

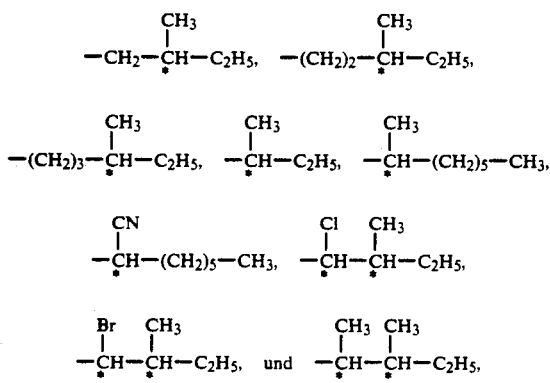

VII:

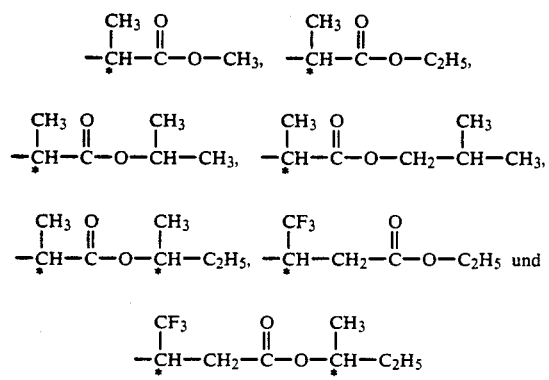

VIII:

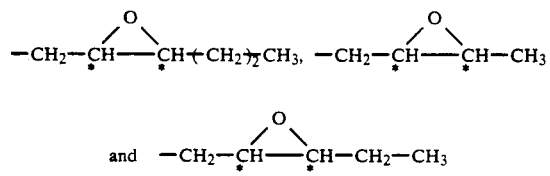

IX:

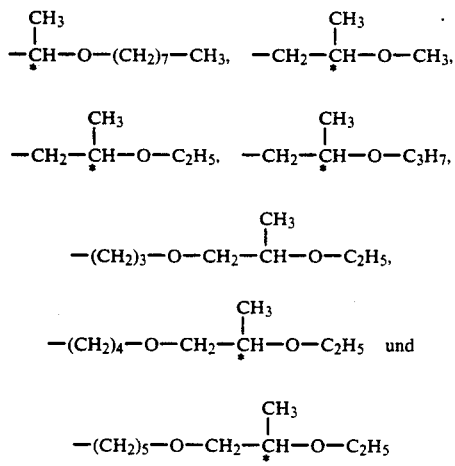

Particularly preferred radicals C are camphan-2-yl, p-menthan-3-yl and in particular pinan-3-yl.

The novel liquid-crystalline polymers can be obtained by polymerizing the monomers I under certain conditions, which must be observed precisely.

In the preparation, the analytically pure, i.e. chromatographically purified and repeatedly recrystallized monomers I are dissolved in an absolute inert solvent, such as toluene, dioxane, dimethylformamide or, in particular, tetrahydrofuran. The monomer concentration in the solution should be from 0.01 to 0.1 mol/l, preferably from 0.02 to 0.06 mol/l.

A protective gas, such as nitrogen or in particular argon, is then expediently passed into this solution. From 1 to 40 mol %, preferably from 1 to 20 mol %, based on the monomers, of a free-radical initiator are then added. Preference is given here to initiators which have a moderate decomposition rate at about 50° C., for example 2,2'-azobis (2-methylpropionitrile).

Further protective gas is passed in, and the solution is then thermostated at from 40° to 60° C., preferably at 50° C., and kept at this temperature for from 100 to 140 hours, preferably for from 100 to 120 hours.

The reaction mixture is worked up in a conventional manner. In a preferred procedure, the mixture is first filtered through a Millipore ® filter (from the Millipore company). Absolute methanol is then added to precipitate the polymerization product from the filtrate, and the product is filtered off and reprecipitated a number of times from tetrahydrofuran by addition of petroleum ether (boiling point 30° to 75° C.). The product is then filtered off and dried in a high vacuum.

Essential factors for carrying out the polymerization according to the invention are the concentration of the monomer solution, the type and amount of the free-radical initiator, the reaction temperature and the reaction time. If said reaction conditions are observed, liquid-crystalline polymers having a non-uniformity of ≦1 can be prepared reproducibly.

The novel liquid-crystalline polymers have, in particular, higher spontaneous polarization and greater tilt angles φ in addition to broader state ranges of the $S_c^*$ phase than the polymers prepared by conventional means. The greater contrast which can thus be achieved means that they are significantly more suitable for the production of recording layers for laser-optical recording elements and for electrographic processes and for the production of liquid-crystalline display elements. If the novel polymers also have a ferroelectric behavior, they can also advantageously be used for the production of electrical recording elements. Preference is given here to novel polymers having molecular weights of from 2,000 to 10,000, in particular from 4,000 to 6,000.

The recording layers are built up as described in DE-A-3 917 196 for laser-optical recording elements, in DE-A-3 930 667 for electrophotography and in Ferroelectrics 104 (1990) 241-256 for electrical recording elements.

EXAMPLES a) Preparation of the Liquid-crystalline Polymers

EXAMPLE 1

Argon was passed into a solution of 2.0 g (4.6 mmol) of the monomer of the formula Ia

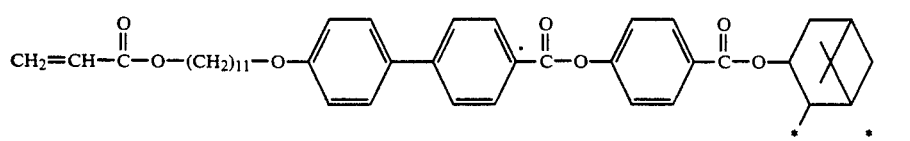

Ia in 50 ml of absolute tetrahydrofuran (≙ in a concentration of 0.093 mol/l) for 15 minutes. 200 mg of 2,2'-azobis(2-methylpropionitrile) were added, and argon was again passed through the solution for 15 minutes. The solution was then thermostated at 50° C. and kept at this temperature for 120 hours.

The reaction mixture was subsequently filtered through a Millipore filter (type FG, pore size 0.2 μm). The product was precipitated from the filtrate by addition of methanol, filtered off, reprecipitated twice from tetrahydrofuran by addition of petroleum ether, isolated and dried in a high vacuum.

The non-uniformity U was determined in a conventional and known manner from the mean molecular weights $\overline{M}_w$ and $\overline{M}_n$ determined by gel permeation chromatography using a polystyrene standard (dispersities <1.1) (Analytiker-Taschenbuch, Vol. 4, pp. 415–442, Springer Verlag (1984)).

Each determination was carried out using 3 columns measuring 7.6×600 mm filled with PL gel ® with a pore width of 100, 100, 1000, and 1000 nm (Polymer Laboratories; crosslinked styrene-divinylbenzene copolymer) and a particle size of 5 μm. The eluent used was tetrahydrofuran and the flow rate was 1.1 ml/min.

The phase sequence and the clearing temperature $T_c$ (temperature of the liquid-crystalline→isotropic phase transition) was determined by thermoanalysis using a differential scanning calorimeter and by polarized light microscopy.

These measurements gave a molecular weight $\overline{M}_n$ of 5612, a non-uniformity U of 0.07 and a clearing temperature $T_c$ of 202° C. for polymer 1.

EXAMPLES 2 TO 8

The polymers shown in Table 1 were prepared and analyzed by methods similar to that of Example 1.

TABLE 1

Liquid-crystalline homopolymers and copolymers

| Ex. | Structure | $\overline{M}_n$ | U | $T_c$ [°C.] |
|---|---|---|---|---|
| 2 | | 4781 | 0.09 | 97 |
| 3 | | 4278 | 0.08 | 170 |
| 4 | | 6241 | 0.09 | 157 |
| 5 | | 6444 | 0.06 | 200 |
| 6 | Molar ratio 1:1 | 5660 | 0.09 | 168 |

TABLE 1-continued

Liquid-crystalline homopolymers and copolymers

| Ex. | Structure | $\overline{M}_n$ | U | $T_c$ [°C] |
|---|---|---|---|---|
| 7 | 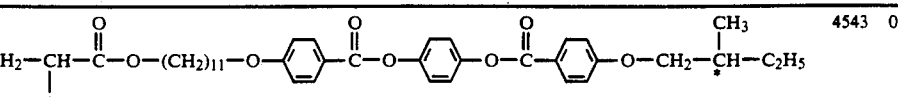  Molar ratio 1:3 | 4543 | 0.09 | 172 |
| 8 |   Molar ratio 1:1 | 4493 | 0.10 | 160 | b) Use Example

A sample of polymer 1 was prepared as described in the experimental procedure in DE-A-3 917 196 between structured, plane-parallel glass plates with an electroconductive coating and an alignment layer. The layer thickness of polymer 1 was 4 μm, according to interferometric measurements.

The measurement cell was filled with the polymer in the isotropic phase by means of capillary forces. The desired planar alignment of the polymer was achieved by means of slow cooling in an electrical field.

The tilt angle $\phi$ [°] was measured in a conventional and known manner by means of a polarizing microscope.

The spontaneous polarization $P_s$ [nC/cm$^2$] was determined by the triangle process likewise described in DE-A-3 917 196.

At 125° C., a tilt angle $\phi$ of 30° and a spontaneous polarization $P_s$ of 40.6 nC/cm$^2$ were measured for sample 1. The width of the $S_c^*$ phase $\Delta T(S_c^*)$ was 50° C.

We claim:

1. A liquid-crystalline polymer of virtually uniform molecular weight, obtained by polymerizing identical or different monomers of the formula I

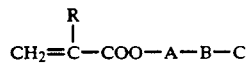

where

R is hydrogen, chlorine or methyl,

A is a flexible, long-chain moiety which acts as a spacer,

B is a mesogenic moiety built up from at least two aromatic rings which are linked to one another in a linear or approximately linear manner, and C is an optically active, chiral moiety, in from 0.01 to 0.1 molar solution in an inert organic solvent in the presence of from 1 to 40 mol %, based on the monomers, of a free-radical initiator, at from 40° to 60° C. for from 100 to 140 hours, and subsequently isolating the polymerization product from the reaction mixture.

2. A process for the preparation of a liquid-crystalline polymer of virtually uniform molecular weight, which comprises polymerizing identical or different monomers of the formula I

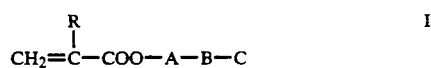

where

R is hydrogen, chlorine or methyl,

A is a flexible, long chain moiety which acts as a spacer,

B is a mesogenic moiety built up from at least two aromatic rings which are linked to one another in a linear or approximately linear manner, and C is an optically active, chiral moiety, in from 0.01 to 0.1 molar solution in an inert organic solvent in the presence of from 1 to 40 mol %, based on the monomers, of a free-radical initiator, at from 40° to 60° C. for from 100 to 140 hours, and subsequently isolating the polymerization product from the reaction mixture.

3. A liquid-crystalline polymer according to claim 1 having a non-uniformity of $\leq 0.1$.

4. A laser-optical decoding element containing as a recording layer a layer of a polymer according to claim 1.

5. An electrophotographic recording element containing as a recording layer a layer of a polymer according to claim 1.

6. An electrical recording element containing as a recording layer a layer of a polymer according to claim 1.

7. A liquid crystalline display element containing as the required crystalline layer a layer of a polymer according to claim 1.

* * * * *